(12) United States Patent
Kida et al.

(10) Patent No.: US 7,136,803 B2
(45) Date of Patent: Nov. 14, 2006

(54) JAPANESE VIRTUAL DICTIONARY

(75) Inventors: Yasuo Kida, Palo Alto, CA (US);
Keisuke Hara, Kawasaki (JP)

(73) Assignee: Apple Computer, Inc., Cupertino, CA (US)

(*) Notice: Subject to any disclaimer, the term of this patent is extended or adjusted under 35 U.S.C. 154(b) by 954 days.

(21) Appl. No.: 09/965,333

(22) Filed: Sep. 25, 2001

(65) Prior Publication Data

US 2003/0061031 A1 Mar. 27, 2003

(51) Int. Cl.
*G06F 17/28* (2006.01)
(52) U.S. Cl. .............................. 704/3; 704/10
(58) Field of Classification Search ............... 704/2, 704/5, 8, 10
See application file for complete search history.

(56) References Cited

U.S. PATENT DOCUMENTS

| | | | |
|---|---|---|---|
| 4,777,600 A | 10/1988 | Saito et al. | |
| 5,946,648 A * | 8/1999 | Halstead et al. | 704/9 |
| 5,963,893 A * | 10/1999 | Halstead et al. | 704/9 |
| 5,999,950 A | 12/1999 | Krueger et al. | |
| 6,374,210 B1 * | 4/2002 | Chu | 704/9 |
| 6,401,060 B1 * | 6/2002 | Critchlow et al. | 704/1 |
| 6,542,090 B1 * | 4/2003 | Tadano et al. | 341/20 |
| 6,707,571 B1 * | 3/2004 | Kurashina | 358/1.18 |
| 6,876,963 B1 * | 4/2005 | Miyahira et al. | 704/4 |

FOREIGN PATENT DOCUMENTS

| | | |
|---|---|---|
| JP | 01093861 | 4/1989 |
| JP | 05094431 | 4/1993 |

OTHER PUBLICATIONS

Uchida, Hiroshi and Sugiyama, Kenji, "Automated Translation of Japanese Kana input into Mixed Kana-Kanji Output," *Fujitsu Scientific and Technical Journal*, vol. 15, No. 2, Jun. 1979, pp. 21-43.
PCT International Search Report for PCT Int'l Appln No. US02/29768, mailed Jul. 23, 2003 (9 pages).

* cited by examiner

*Primary Examiner*—Abul K. Azad
(74) *Attorney, Agent, or Firm*—Blakely, Sokoloff, Taylor & Zafman LLP

(57) ABSTRACT

Methods for converting a source character string to a target character string are described herein. In one aspect of the invention, an exemplary method includes receiving a first character string having the source character string, dividing the first character string into a plurality of sub-strings, converting the plurality of the sub-strings to second character strings through a dictionary, creating third character strings corresponding to the plurality of the sub-strings, analyzing the second and third character strings, constructing fourth character strings from the second and third character strings based on the analysis, creating a candidate list based on the fourth character strings, selecting the target character string from the candidate list and outputting the target character string. Other methods and apparatuses are also described.

116 Claims, 12 Drawing Sheets

| | | | | |
|---|---|---|---|---|
| あ | い | う | え | お |
| か | き | く | け | こ |
| さ | し | す | せ | そ |
| た | ち | つ | て | と |
| な | に | ぬ | ね | の |
| は | ひ | ふ | へ | ほ |
| ま | み | む | め | も |
| や | — | ゆ | — | よ |
| ら | り | る | れ | ろ |
| わ | を | ん | — | — |
| が | ぎ | ぐ | げ | ご |
| ざ | じ | ず | ぜ | ぞ |
| だ | ぢ | づ | で | ど |
| ば | び | ぶ | べ | ぼ |
| ぱ | ぴ | ぷ | ぺ | ぽ |

— 151

| | | | | |
|---|---|---|---|---|
| ア | イ | ウ | エ | オ |
| カ | キ | ク | ケ | コ |
| サ | シ | ス | セ | ソ |
| タ | チ | ツ | テ | ト |
| ナ | ニ | ヌ | ネ | ノ |
| ハ | ヒ | フ | ヘ | ホ |
| マ | ミ | ム | メ | モ |
| ヤ | — | ユ | — | ヨ |
| ラ | リ | ル | レ | ロ |
| ワ | ヲ | ン | — | — |
| ガ | ギ | グ | ゲ | ゴ |
| ザ | ジ | ズ | ゼ | ゾ |
| ダ | ヂ | ヅ | デ | ド |
| バ | ビ | ブ | ベ | ボ |
| パ | ピ | プ | ペ | ポ |

JAPANESE VIRTUAL DICTIONARY

FIELD OF THE INVENTION

The present invention relates generally to the field of electronic text entry, and more particularly to a method of entering Japanese hiragana characters and translating into appropriate Japanese words using a combination of hiragana, katakana and kanji characters.

BACKGROUND OF THE INVENTION

The Japanese written language contains three separate character strings. Simple Japanese characters representing phonetic syllables are represented by the hiragana and katakana character sets (together referred to as "kana"). Hiragana characters, which are characterized by a cursive style, are typically used for words native to Japan. Katakana characters, which are characterized by a more angular style, are typically used for words borrowed from other cultures, or for emphasis and sound effects. The third character set in Japanese is kanji. Kanji are the complex Japanese characters borrowed from the Chinese language. There are over 9000 kanji characters in the Japanese language. Approximately 4000 kanji are used on a semi-regular basis, while knowledge of 2000 kanji is generally required to read a newspaper or get around in Japan. The complexity of the Japanese written language poses several challenges for efficient text entry in computers, word processors, and other electronic devices.

FIG. 1A shows an example of Japanese hiragana and katakana characters. The hiragana 151 and katakana 152 character sets each contain 46 base characters. Both sets of kana have identical pronunciations and rules of construction, only the shapes of the characters are different to emphasize the different usage of the words. Some base kana characters are used in certain combinations and in conjunction with special symbols (called "nigori" and "maru") to produce voiced and aspirated variations of the basic syllables, thus resulting in a full character set for representing the approximately 120 different Japanese phonetic sounds. If a Japanese keyboard included separate keys for all of the voiced and aspirated variants of the basic syllables, the keyboard would need to contain at least 80 character keys. Such a large number of keys create a crowded keyboard with keys, which are often not easily discernible. If the nigori and maru symbol keys are included separately, the number of character keys can be reduced to 57 keys. However, to generate voiced or aspirated versions of a base character requires the user to enter two or more keystrokes for a single character.

Common methods of Japanese text entry for computers and like devices typically require the use of a standard Japanese character keyboard or a roman character keyboard, which has been adapted for Japanese use. A typical kana keyboard has keys which represent typically only one kana set (usually hiragana) which may be input directly from the keyboard. A conventional method is to take the hiragana text from the keyboard containing the hiragana keys as an input, and convert it into a Japanese text using a process called Kana-Kanji conversion. A typical Japanese text is represented by hiragana, katakana and kanji characters, such as sentence 150, which has English meaning of "Watch a movie in San Jose". The text 150 includes katakana characters 154 which are corresponding to a foreign word of "San Jose", a hiragana character 155 that is normally used as a particle, and a kanji character set 153.

FIG. 1B shows a conventional method of converting a hiragana text to a Japanese text. Referring to FIG. 1, the Japanese hiragana characters are entered 1101 through a keyboard. The hiragana characters are converted 102 to Japanese texts by looking up characters in a database (e.g., dictionary). Then the user has to inspect 103 and check 104 whether the conversion is correct. If the conversion is incorrect (e.g., the dictionary does not contain such conversion), the user has to manually force the system to convert the hiragana text. A typical user interaction involves selecting 105 portions of the hiragana texts, which are converted incorrectly and explicitly instructing 106 the system to convert such portion. The system then presents 107 a candidate list including all possible choices. The user normally checks 109 whether the conversion is correct. If the conversion is correct, the user then selects 108 a choice as its best output and inserts the correct result to form the final output text. If the conversion is incorrect, the user reselects a different portion of the input and tries to manually convert the reselected portion again.

One of the conventional methods, transliteration (direct conversion from hiragana to katakana) normally does not provide a correct result for most of the cases, because typically users choose (e.g., in a method shown in FIG. 1B), instead of the katakana word, a segment containing the word and one or more trailing post particles that are written in hiragana in the final form. The normal transliteration will also convert all trailing post particles to katakana form which is incorrect.

Another conventional method generates alternative candidates by transliterating the leading sub-string of the string. This method takes advantage of the fact that the trailing particles are always trailing and are all in hiragana. This method creates many candidates that may include the correct one among them. Following is an illustration of an example of the a conventional method (in English):

| | |
|---|---|
| input: | inthehouse |
| output 1: | INTHEHOUSE |
| output 2: | i NTHEHOUSE |
| output 3: | in THEHOUSE |
| output 4: | int HEHOUSE |
| output 5: | inth EHOUSE |
| output 6: | inthe HOUSE - (correct one) |
| output 7: | intheh OUSE |
| output 8: | intheho USE |
| output 9: | inthehou SE |
| output 10: | inthehous E |
| output 11: | inthehouse |

As described above, the conventional method generates many candidates after the user selects a potion of the input text to be corrected, which may lead to confusion of the final selection, even though such candidates may include a correct choice. Another conventional method involves an analyzer, which can recognize post particles. It analyzes the range from the end until the analyzer cannot find post particles any more. However, the conventional methods require a user to interact thereby potentially lower efficiency in order to achieve accurate results.

One of the disadvantages of the conventional method is that if a Katakana word is not in the dictionary, the conversion containing the Katakana word usually fails. Another disadvantage of this method is that it involves user-specific interaction to convert and select the best candidate. It consumes more time and efforts if the user does not know the possible outputs of the conversion. Hence, a better method to automatically and efficiently convert Japanese hiragana character string to katakana character string is highly desirable.

SUMMARY OF THE INVENTION

The present invention discloses methods and apparatuses for converting a first character string to a second character string. In addition to a regular dictionary, the invention includes a virtual dictionary to generate an artificial character string based on the first character string. When the first character string cannot be converted through a regular dictionary (e.g., the regular dictionary does not know the first character string), the invention uses the artificial character string generated by the virtual dictionary to convert the first character string. Therefore, with the virtual dictionary of the invention, the conversion never fails.

In one aspect of the invention, an exemplary method includes receiving a hiragana input, automatically determining a plurality of possible katakana candidates based on the hiragana input, analyzing the plurality of possible katakana candidates to convert the hiragana input to katakana characters, selecting one of the katakana candidates, and outputting converted text comprising the one of the katakana candidates and, at least in some cases, kanji characters.

In another aspect of the invention, an exemplary method includes receiving a first character string having the source character string, dividing the first character string into a plurality of sub-strings, converting the plurality of the sub-strings to second character strings through a dictionary, creating third character strings corresponding to the plurality of the sub-strings, analyzing the second and third character strings, constructing fourth character strings from the second and third character strings based on the analysis, creating a candidate list based on the fourth character strings, selecting the target character string from the candidate list and outputting the target character string.

In one particular exemplary embodiment, the method includes constructing the fourth character strings from the second character strings, if the second character strings contain a character string corresponding to the first character string, and constructing the fourth character strings from the third character strings if the second character strings do not contain the character string corresponding to the first character sting. In another embodiment, the method includes examining the output of the conversion to determine whether the conversion is correct, providing the candidate list of alternative character strings if the conversion is incorrect, and selecting a character string from the candidate list as a final output. In a further embodiment, the method includes providing an artificial target character string and updating the database based on the artificially created character string.

The present invention includes apparatuses which perform these methods, and machine readable media which when executed on a data processing system, causes the system to perform these methods. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 1A shows examples of Japanese characters including hiragana, katakana, and kanji characters.

DETAILED DESCRIPTION

The following description and drawings are illustrative of the invention and are not to be construed as limiting the invention. Numerous specific details are described to provide a thorough understanding of the present invention. However, in certain instances, well-known or conventional details are not described in order to not unnecessarily obscure the present invention in detail.

Japanese is written with kanji (characters of Chinese origin) and two sets of phonetic kana symbols, hiragana and katakana. A single kanji character may contain one symbol or several symbols, and may, by itself, represent an entire word or object. Unlike kanji, kana have no intrinsic meaning unless combined with other kana or kanji to form words. Both hiragana and katakana contain 46 symbols each. Combinations and variations of the kana characters provide the basis for all of the phonetic sounds present in the Japanese language. All Japanese text can be written in hiragana or katakana. However, since there is no space between the words in Japanese, it is inconvenient to read a sentence when the words of the sentence are constructed by either hiragana or katakana only. Therefore most of the Japanese texts include hiragana, katakana and kanji characters. Normally, kanji characters are used as nouns, adjectives or verbs, while hiragana and katakana are used for particles (e.g., "of", "at", etc.).

As computerized word processors have been greatly improved, the Japanese word processing can be implemented through a word processing software. Typical Japanese characters are inputted as hiragana only because it is impractical to include all of hiragana, katakana and kanji characters (kana-kanji) in a keyboard. Therefore, there is a lot of interest to create an improved method of converting hiragana characters to katakana characters. The present invention introduces a unique method to convert hiragana characters to katakana characters automatically based on the predetermined relationships between hiragana characters and katakana characters. The methods are normally performed by software executed in a computer system.

Figure 1B:
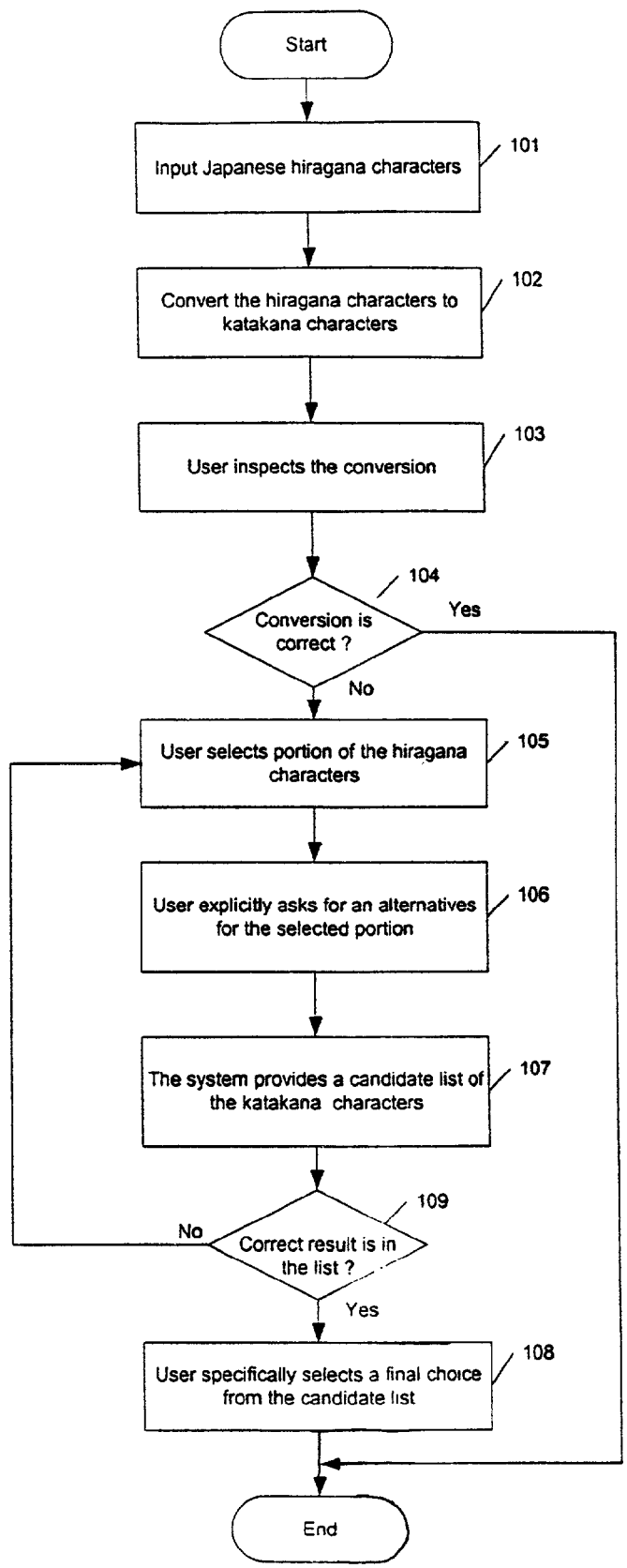
FIG. 1B shows a conventional method of converting a hiragana text to a Japanese text.
Figure 2:
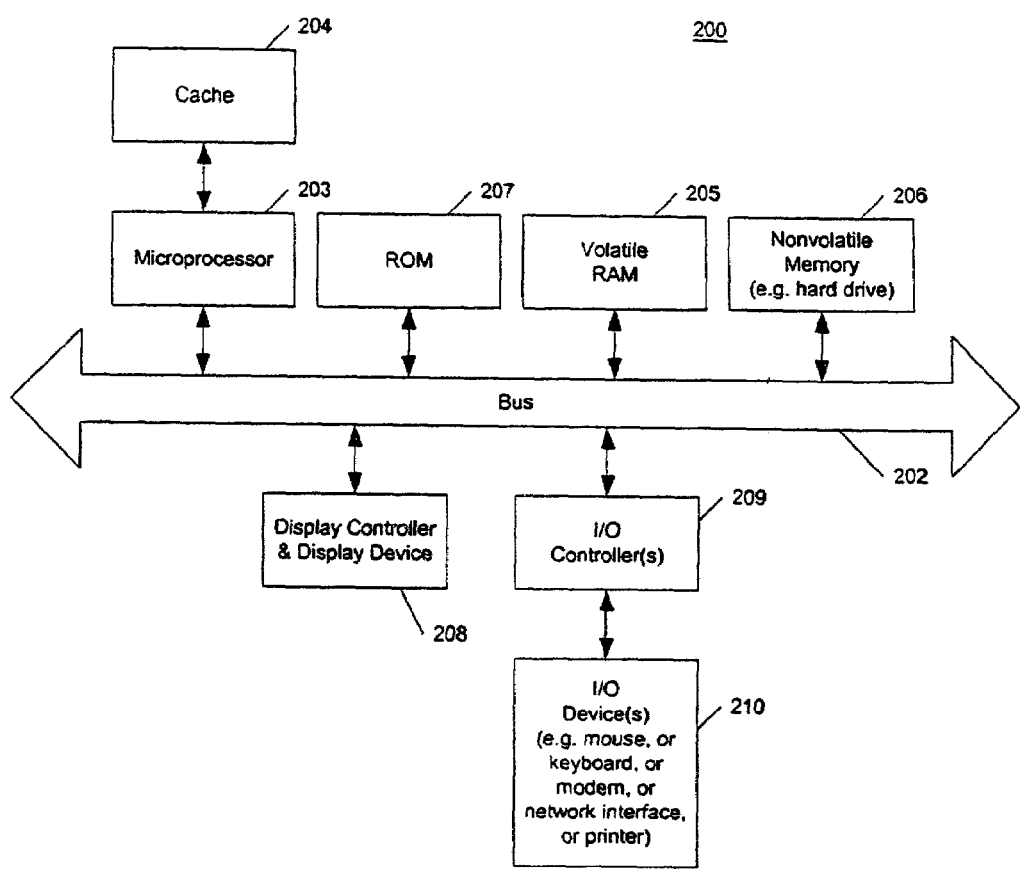
FIG. 2 shows a computer system which may be used with the present invention.

FIG. 2 shows one example of a typical computer system, which may be used with the present invention. Note that while FIG. 2 illustrates various components of a computer system, it is not intended to represent any particular architecture or manner of interconnecting the components as such details are not germane to the present invention. It will also be appreciated that network computers and other data processing systems (e.g., a personal digital assistant), which have fewer components or perhaps more components, may also be used with the present invention. The computer system of FIG. 2 may, for example, be an Apple Macintosh computer or a personal digital assistant (PDA).

As shown in FIG. 2, the computer system 200, which is a form of a data processing system, includes a bus 202 which is coupled to a microprocessor 203 and a ROM 207 and volatile RAM 205 and a non-volatile memory 206. The microprocessor 203, which may be a G3 or G4 microprocessor from Motorola, Inc. or IBM is coupled to cache memory 204 as shown in the example of FIG. 2. The bus 202 interconnects these various components together and also interconnects these components 203, 207, 205, and 206 to a display controller and display device 208 and to peripheral devices such as input/output (I/O) devices which may be mice, keyboards, modems, network interfaces, printers and other devices which are well known in the art. Typically, the input/output devices 210 are coupled to the system through input/output controllers 209. The volatile RAM 205 is typically implemented as dynamic RAM (DRAM) which requires power continually in order to refresh or maintain the data in the memory. The non-volatile memory 206 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers and/or adapters as are well known in the art. In one embodiment the I/O controller 209 includes a USB (Universal Serial Bus) adapter for controlling USB peripherals.

Figure 3:
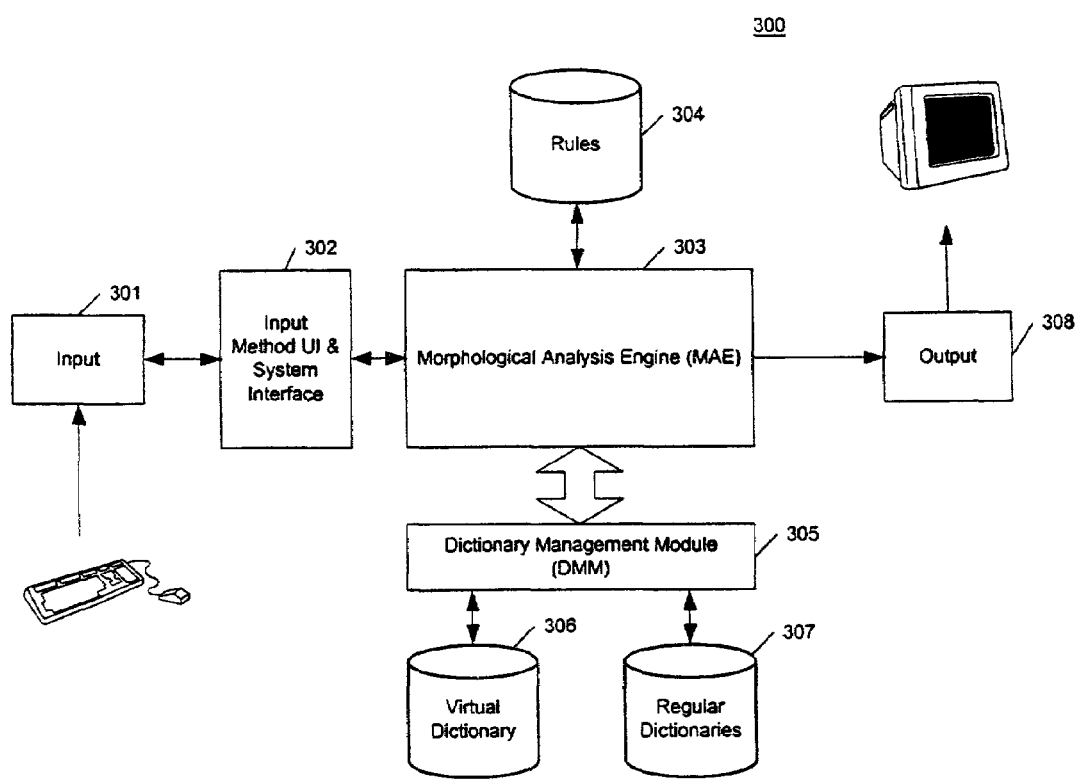
FIG. 3 shows one embodiment of the kana-kanji conversion system of the present invention.

FIG. 3 shows a system used by an embodiment of the invention. Referring to FIG. 3, the system 300 typically includes an input unit 301, an input method UI, and system interface 302, a morphological analysis engine (MAE) 303, a dictionary management module (DMM) 305 and an output unit 308. The input unit 301 may be a keyboard such as I/O device 210 of FIG. 2. The input unit may be a touch pad, such as a personal digital assistant (PDA). The input unit may be a set of application programming interfaces (APIs) that receive inputs from an application. Other types of inputs may exist. The input unit 301 accepts Japanese characters inputted (e.g., Japanese hiragana characters). The hiragana characters are transmitted to the input method and interfaces 302, which in turn transmits to the MAE 303. The MAE 303 then accesses to a databases, such as regular dictionaries 307 and virtual dictionary 306, through DMM 305. The regular dictionaries 307 may include most known Japanese words corresponding to the hiragana words. The regular dictionaries 307 may be stored in a random access memory (RAM), such as volatile RAM 205, or it may be stored in a hard disk, such as nonvolatile memory 206. In one embodiment, the regular dictionaries 307 may be stored in a remote storage location (e.g., network storage), through a network. It is useful to note that the present invention may be implemented in a network computing environment, wherein the regular dictionaries may be stored in a server and an application executed in a client accesses to the regular dictionaries through a network interface over a network. Multiple applications executed at multiple clients may access the regular dictionaries simultaneously and share the information of the regular dictionaries over the network. Although the regular dictionaries 307 are illustrated as single dictionary, it would be appreciated that the regular dictionaries 307 may comprise multiple dictionaries or databases. In another embodiment, the regular dictionaries 307 may comprise multiple look-up tables. The virtual dictionary 306 may direct convert every single hiragana character to a katakana character. The virtual dictionary may contain a look-up table to look up every single katakana character for each hiragana character. The DMM 305 is responsible for managing all dictionaries including dictionaries 306 and 307. DMM 305 is also responsible for updating any information to the dictionaries upon requests from the MAE 303. In one embodiment, the DMM 305 also manages another database 304 where all of the rules or policies are stored.

The virtual dictionary 306 may include direct translation of the hiragana characters to katakana characters. The virtual dictionary 306 may return all multiple words with different part of speeches. In one embodiment, the virtual dictionary may return three parts of speeches. They are noun, noun that can be used as verb and adjective. It is useful to note that artificially generated katakana words from the virtual dictionary look no different from regular words once they are returned from the virtual dictionary.

In another embodiment, the dictionary database may be divided into two or more dictionaries. One of them is a regular dictionary containing regular words. The other dictionary is a special dictionary (e.g., so-called virtual dictionary). The special dictionary may contain all possible katakana characters including the artificial katakana characters created during the processing. The katakana is straight transliteration of the hiragana input. The virtual dictionary may return multiple words with different part of speeches. Each word has its priority value. Such priority value may be assigned by the virtual dictionary. For example, in the implementation for string "A-Ka-Ma-I", the dictionary may return three outputs with different part of speeches, Noun, Noun that is associated with verb and adjective, as follows:

A-Ka-Ma-I POS: Noun Priority: 100

A-Ka-Ma-I POS: Noun that can work as a verb Priority: 100

A-Ka-Ma-I POS: Adjective Priority: 100

Other implementations may exist.

Three words can be considered as one record, or they may be considered as three separate records. The priority value can be the same for all words returned from the dictionary. The priority value could be calculated from the katakana and/or the part of speeches. In one embodiment, the priority value is determined by the length of the word. In another embodiment, the priority may be based on bi-gram and tri-gram statistics of the katakana and can be adjusted based on the part of speeches. Typically the priority value is set lower than all or most of regular words in regular dictionaries, in order to prevent the artificial katakana words from appearing as the most probable conversion when there are proper regular words available.

Part of speeches defines how often or easy words of a certain part-of-speech come next to the other words of certain part-of-speech. It could be just yes/no value. Subject to the implementation, there are cases one word has two part-of-speeches. One for the right side connection and the other for left side connection. Also, there are cases that it is also used to determine not only the next or previous words, but also the connection with words at before the previous or after the next.

Referring to FIG. 3, the MAE 303 sends a request to DMM 305 to convert the inputted hiragana words. The DMM 305 searches the regular dictionaries 307 for corresponding Japanese words. At the mean while, the MAE 303 then sends a request to DMM 303 to retrieve all possible katakana character combinations from the virtual dictionary 306. In general the MAE 303 will select the words from the regular dictionaries 307, if the dictionaries 307 contain such direct translation. Otherwise, the MAE 303 will select an artificial katakana word created by the virtual dictionary 306.

The MAE 303 also invokes a set of rules from a database 304 and applies the set of rules to the analysis of all possible combinations. The database 304 containing the rules may be a separate database, or it may be the same database as the dictionary 306 or 307. Each of the possible combinations is associated with a usage frequency. The usage frequency represents how frequent the characters are previously being used. The dictionary may also include a connection relationship between each character set (e.g., noun, adjective, and verb, etc.). The set of rules may include the information of usage frequency and connection relationship. The MAE 303 applies these rules to construct a possible candidate pool or list from the possible combination from the dictionary 306, based on the set of rule. In one embodiment, the set of rules may include semantic or grammar rules to construct the candidate list. For example, the word "hot" may mean hot temperature or mean spicy food. When the word "hot" is associated with the word "summer", e.g., "hot summer", the word "hot" means more like "hot temperature", rather then "spicy". The MAE 303 may calculate the cost values of the candidates based on the set of rule. The final candidate may consist of the least cost value among the candidate list.

Figure 4:
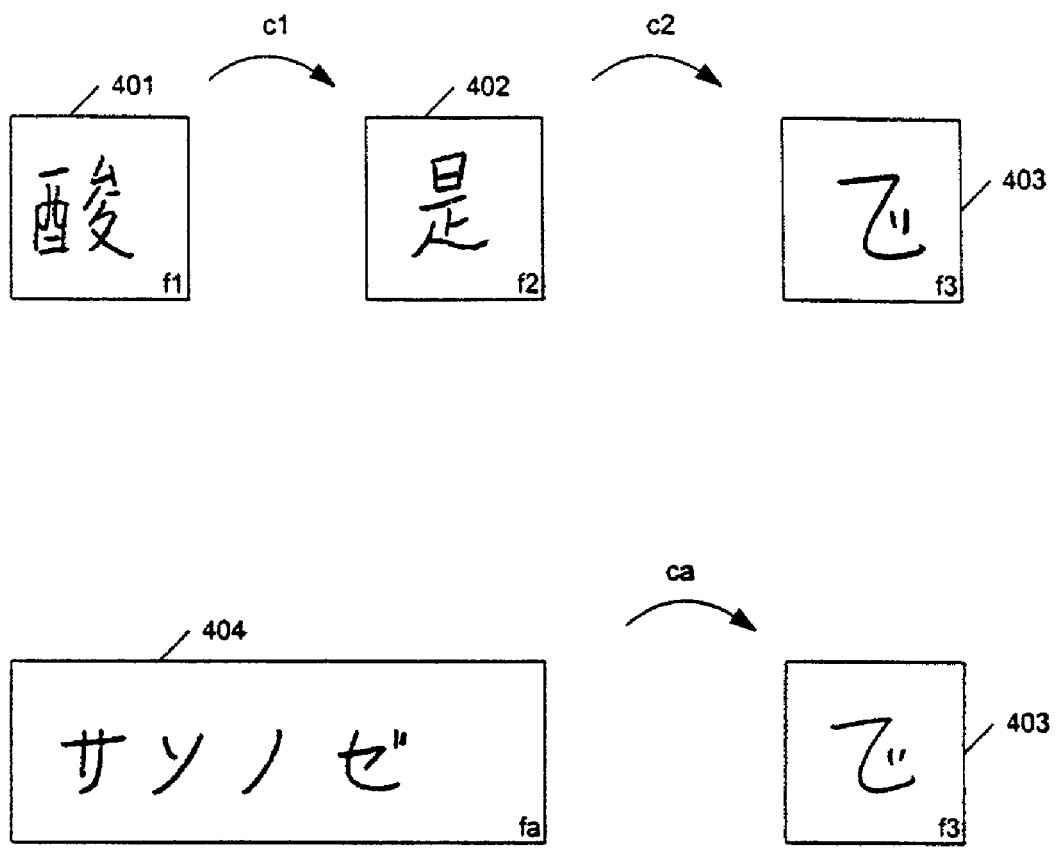
FIG. 4 shows an example of calculation of cost values of the katakana character set used by one embodiment of the invention.

FIG. 4 shows an example of two candidates being constructed to represent the word of "San Jose", where each of them comprises a usage frequency. The first choice comprises character 401, 402 and second choice comprises character set 404. Character 404 is a particle. Character 401 has a usage frequency of f1 and character 402 has a usage frequency f2. The particle character 403 has a usage frequency f3. In addition, the connection between characters 401 and 402 is c1 and c2 between characters 402 and 403. As a result, the cost value of the first choice may be:

Cost Value $1 = f1 + f2 + f3 + c1 + c2$

Similarly, the second choice may have cost value of:

Cost Value $2 = fa + f3 + ca$

In one embodiment, the cost values may include semantic or grammar factors. The evaluation unit 303 evaluates the cost values of two choices and selects the one with the least cost value, in this case cost value 2, as a final output of the conversion.

Figure 5:
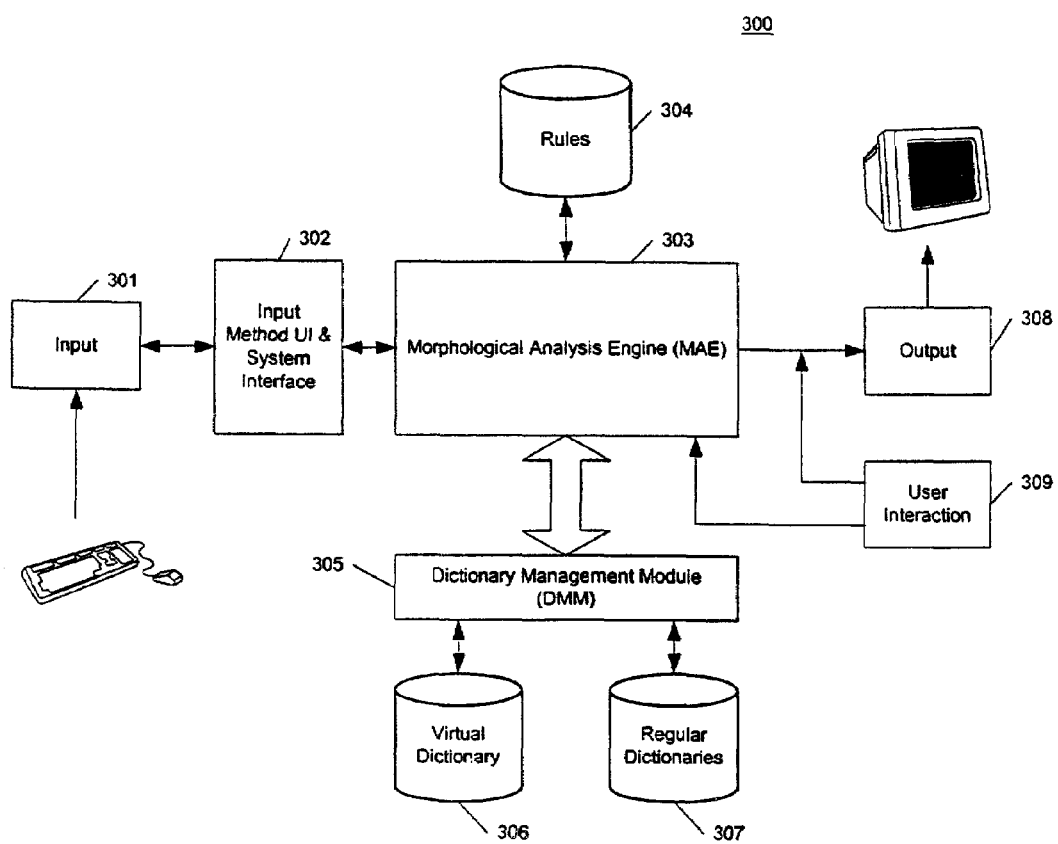
FIG. 5 shows another embodiment of the kana-kanji conversion system with user interaction of the present invention.

However, although the evaluation unit selects the final output based on least cost value and in most cases the selected outputs are correct, in some rare cases, the correct output may not has least cost value. Under the circumstances, the invention provides an opportunity for a user to interact. FIG. 5 shows another embodiment of the present invention. Referring to FIG. 5, the system 300 provides a user interaction 309, where the user can examine the output generated by the MAE 303 and determine whether the output is correct. If the user decides the output is incorrect, the MAE 303 retrieves the candidate list from the database (e.g., virtual dictionary 306), through DMM 305, and displays the candidate list to a user interface. In one embodiment, the user interface may be a pop-up window. The user then can select the best choice (e.g., final choice) from the candidate list as an output. In a further embodiment, the output may be transmitted to an application through an application programming interface (API), from which the application may select a final choice.

In another embodiment, if the candidate list does not contain a correct output the user desires, the invention further provides means for user directly enters the final output manually and force the system to convert the hiragana characters to katakana characters. The system will update its database (e.g., virtual dictionary 306 or regular dictionaries 307) to include the final output katakana word entered by the user as a future reference. In a further embodiment, the user may in fact modify the rules applied to the conversion and store the user specific rules in the database 304.

Figure 6A:
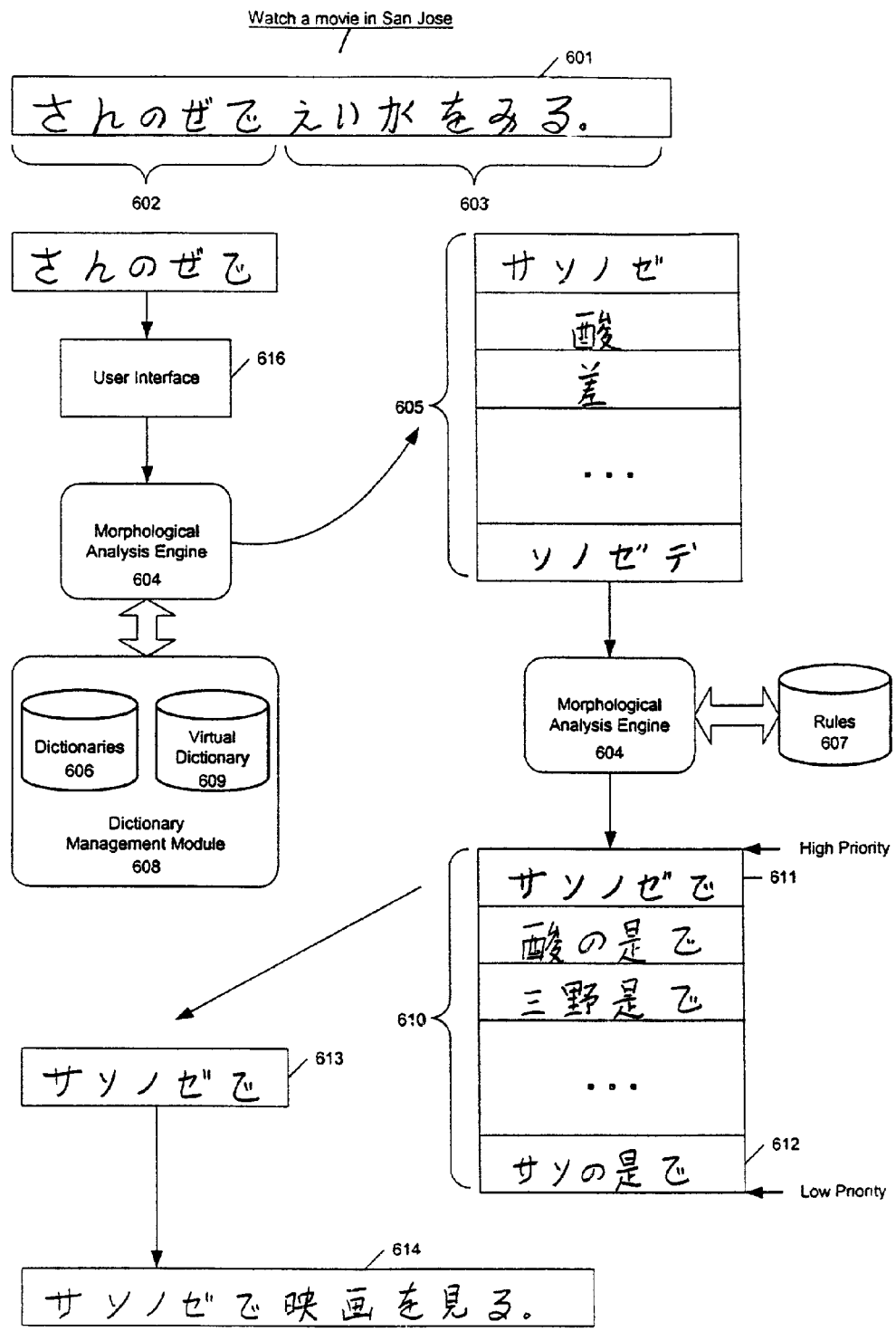
FIG. 6A shows an embodiment of conversion processes from hiragana character set to katakana character set of the invention.

FIG. 6A shows a block diagram of an embodiment of the invention. A Japanese hiragana character string 601, which has English meaning of "Watch a movie in San Jose", is inputted to the system. The morphological analysis engine (MAE) 604 will look up a database, such as dictionaries 307, to search corresponding Japanese words. The system transmits the portion 602 to the morphological analysis engine (MAE) 604, through a user interface 616. The MAE 604 divides the input into a plurality of sub-strings and communicates with the dictionary management module (DMM) 608 and looks up dictionaries 606 for direct translation for each sub-string. At the mean while, the DMM instructs the virtual dictionary 609 to create all possible katakana words corresponding to each sub-string. As a result, a pool of words 605 is formed with regular Japanese words from the regular dictionaries 606 and artificially created katakana words from the virtual dictionary 609. In one embodiment, each of those Japanese character strings 605 is associated with a usage frequency value and there is connection relationship information between each of the character set. In another embodiment, each of the character strings 605 is associated with a priority value. Typically the priorities of the artificially created katakana words are lower than the regular words from the regular dictionaries to prevent any confusion. That is, the system will pick the regular words from the regular dictionaries over the artificially created katakana words. The system utilizes the artificially created words only when there are no corresponding regular words from dictionaries 606. The priority information may be stored in the dictionaries 606 as well. Next, the MAE 604 evaluates and analyzes the character strings 605 and applies a set of rules from the database 607. Although database 607 and dictionary 606 are illustrated as separate databases, it would be appreciated that these two databases may be combined to form a single database. The MAE 604 constructs another set of character strings 610 from the character strings 605, based on the set of rules. The words 610 are considered as a candidate list, where the word with least cost value is considered higher priority, such as word 611, while the character set with high cost value, such as word 612, is considered lower priority. Other priority schemes may exist. Based on the candidate list, the MAE 604 selects a candidate with higher priority, such as character strings613 as final target character string. The character string 613 is then applied to the rest of the character strings to form the final sentence 614.

Figure 6B:
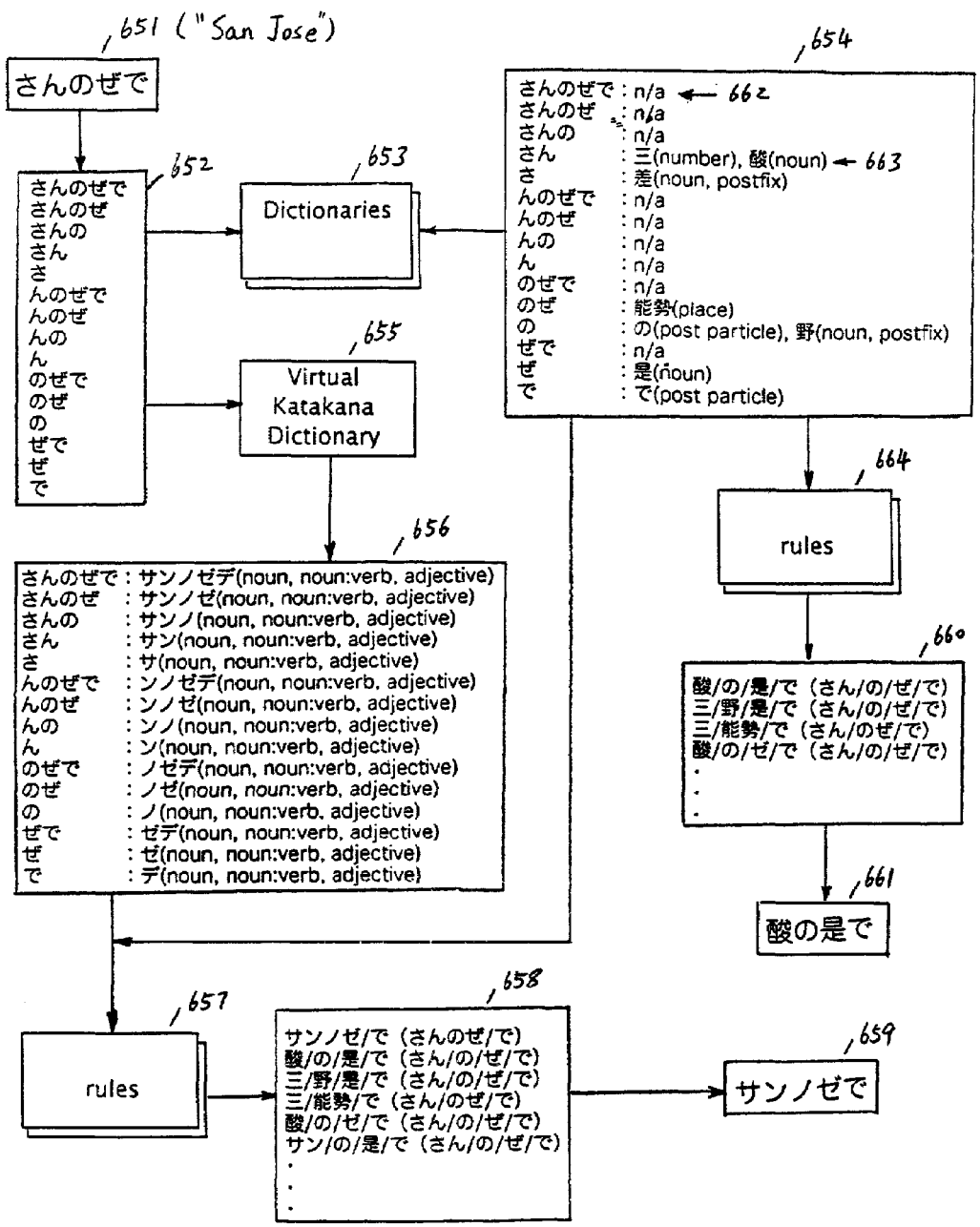
FIG. 6B shows an illustration of an example of the invention versus a process of a conventional method.

FIG. 6B shows a method used by the invention against a conventional method. Referring to FIG. 6B, a Japanese hiragana character string 651, which has an English meaning of "San Jose", is inputted through an input method. The input method normally divides the input into multiple sub-strings 652. For each of the multiple sub-strings, the dictionaries 653 are used to convert the sub-strings 652 as much as possible into another set of Japanese words 654. The dictionaries 653 normally contain most of the known words, such as word 663. However, in the case of word "San Jose", such as word 662, it is not known to the dictionaries. Thus, the dictionaries are not able to convert it, leaving the word 662 unavailable. A conventional method will perform analysis on the words 654, applies rules 664 (e.g., grammar rules), and generates a candidate list 660. From which word 661 is selected as a final candidate, which is incorrect. As a result, a user must manually convert the input 651 to generate the correct conversion.

The present invention introduces a virtual katakana dictionary 655. In addition to the conversion using regular dictionaries, the virtual dictionary 655 takes the sub-strings 652 and creates a set of corresponding artificial katakana words 656. By combining the regular words 654 from the dictionaries 653 and the artificial katakana words 656 generated from the virtual dictionary 655 and applying set of rules, the full set of words 658 corresponding to the sub-strings are created. As a result, each of the sub-strings has its corresponding converted string, which may be a regular Japanese word, such as word 663, or an artificial katakana word. The invention then creates a candidate list 658 based on the set of rules 657. Each of the candidates is associated with a priority based on the rules. From the candidate list the word with highest priority is selected as final correct candidate 659.

Figure 7:
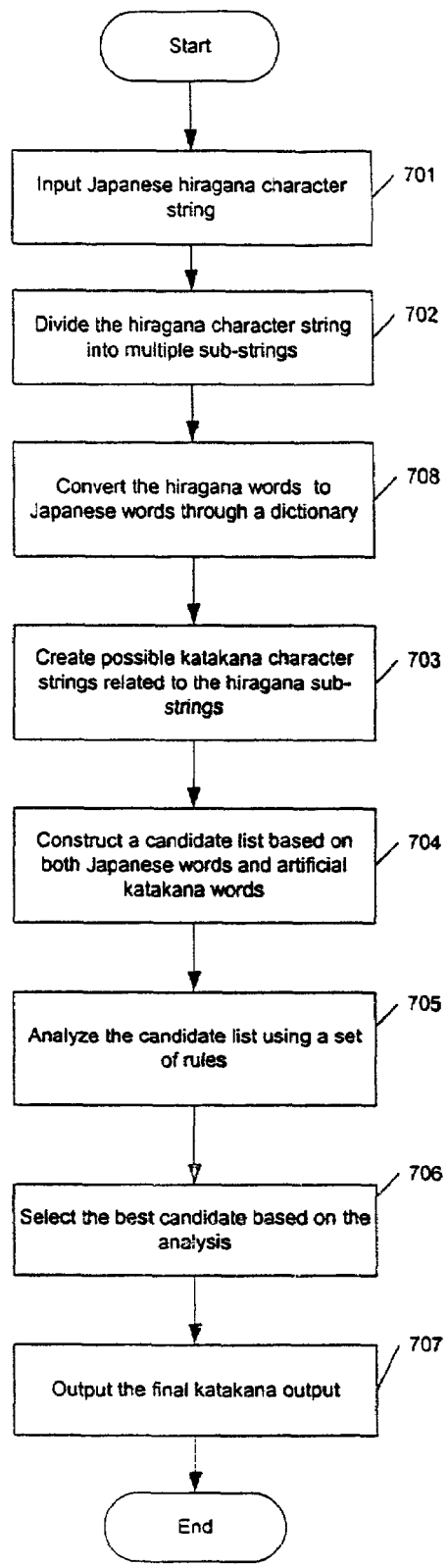
FIG. 7 shows a method of converting hiragana characters to katakana characters of the invention.

FIG. 7 shows a method of an embodiment of the invention. Referring to FIGS. 6A and 7, the method starts with inputting 701 Japanese hiragana characters, such as hiragana character string 601. It divides 702 the hiragana character string into multiple sub-strings and converts 708 each of the sub-strings into Japanese words through a dictionary, such as dictionaries 606. At the mean while, the method creates 703 all possible katakana character strings related to the input, through the virtual dictionary 609. A pool of the Japanese words 605 is formed from both the regular words and artificial katakana words. It then constructs 704 a candidate list 610, wherein the candidate with lower cost value has higher priority while the candidate with higher cost value has lower priority. The priority of the artificially created katakana words may be assigned by the virtual dictionary. The method then analyzes 705 the candidate list and selects 707 the best candidate 613 (e.g., lowest cost value) based on the analysis. The final candidate is then outputted 708 to form the final sentence 614.

Figure 8:
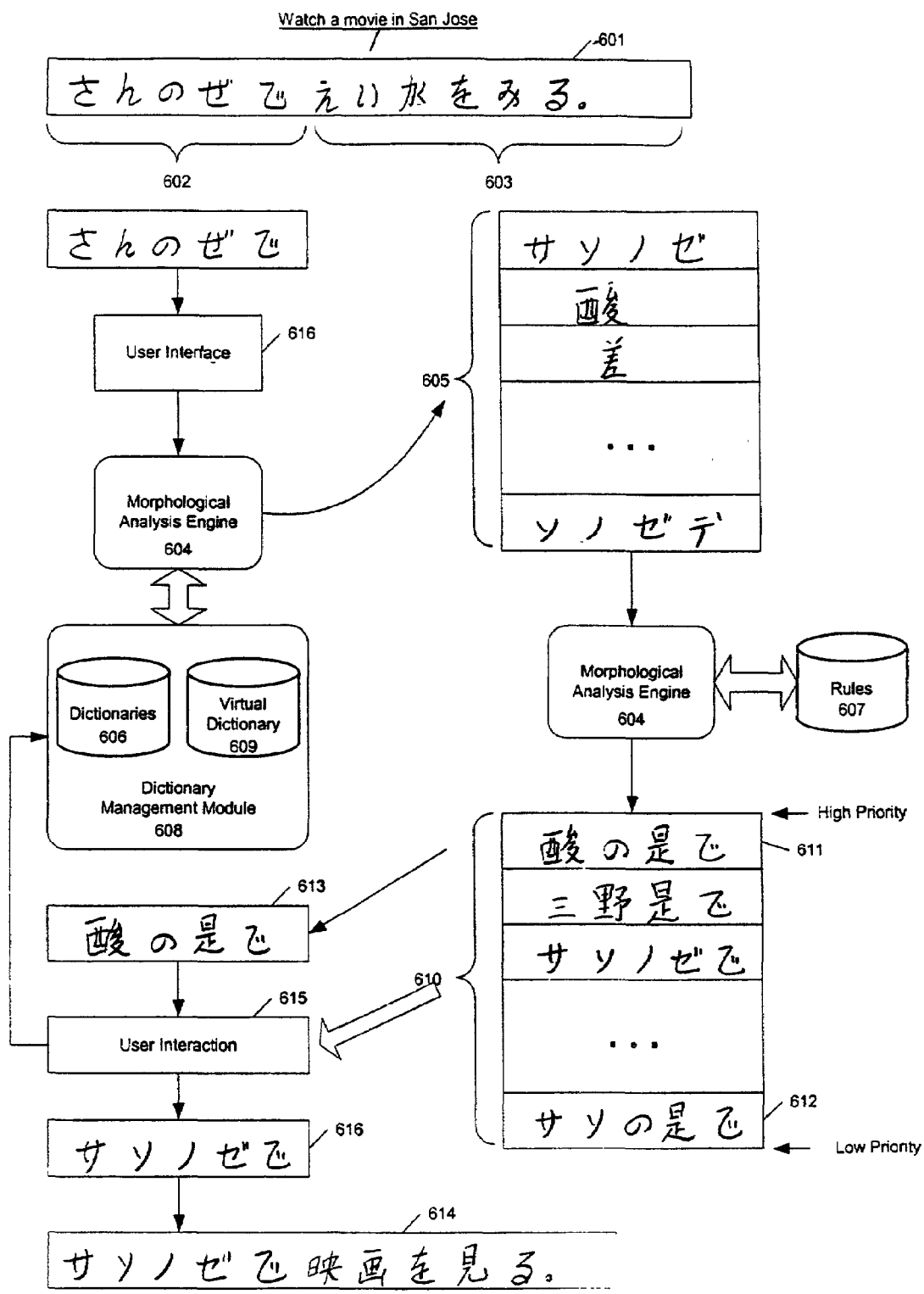
FIG. 8 shows another embodiment of conversion processes from hiragana character set to katakana character set of the invention.

FIG. 8 shows another embodiment of the invention, where the invention may involve a user interaction. The input 601 contains Japanese hiragana character string where portion 602 (e.g.,"San Jose") cannot be directly converted, while portion 603 can be converted through regular dictionaries 606. The system then uses virtual dictionary 609 to create all possible corresponding katakana words for every single sub-strings of portion 602. The morphological analysis engine (MAE) 604 then constructs a candidate list 610 based on a set of rules. The set of rules may include character's usage frequency and connection relationship information between the characters. In another embodiment, the set of rules may contain semantic and grammar rules. A cost value is calculated for each candidate of the list. The candidate with the least cost value has highest priority, while the candidate with the most cost value has lower priority. As shown in FIG. 8, candidate 611 has highest priority among the candidates in the list. As a result, candidate 611 is selected as a final choice for the conversion by the evaluation unit 604. However, in some rare cases, the choice 611 may not be correct, in which case, it involves a user interaction 615. During the user interaction, the user selects portion of the input, such as portion 602 which has an English meaning of"San Jose" and instructs the system to convert it. The system will pull out the pool of all candidates, such as candidate list 610. In one embodiment, the candidate list is displayed through user interface, such as a pop-up window. From the list, the user selects the final output 616 and forms the final sentence 614. Based on the user's selection, the system may update its database (e.g., dictionaries 606 and virtual dictionary 609), so that subsequent conversion will most likely succeed.

Figure 9A:
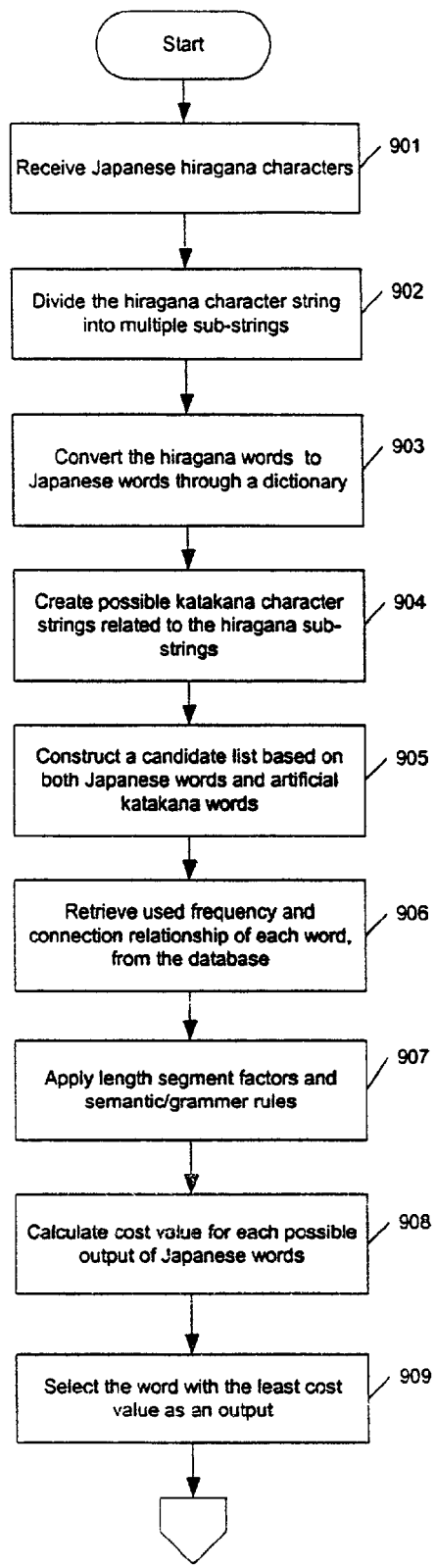
FIGS. 9A and 9B show another method of converting hiragana characters to katakana characters of the invention.
Figure 9B:
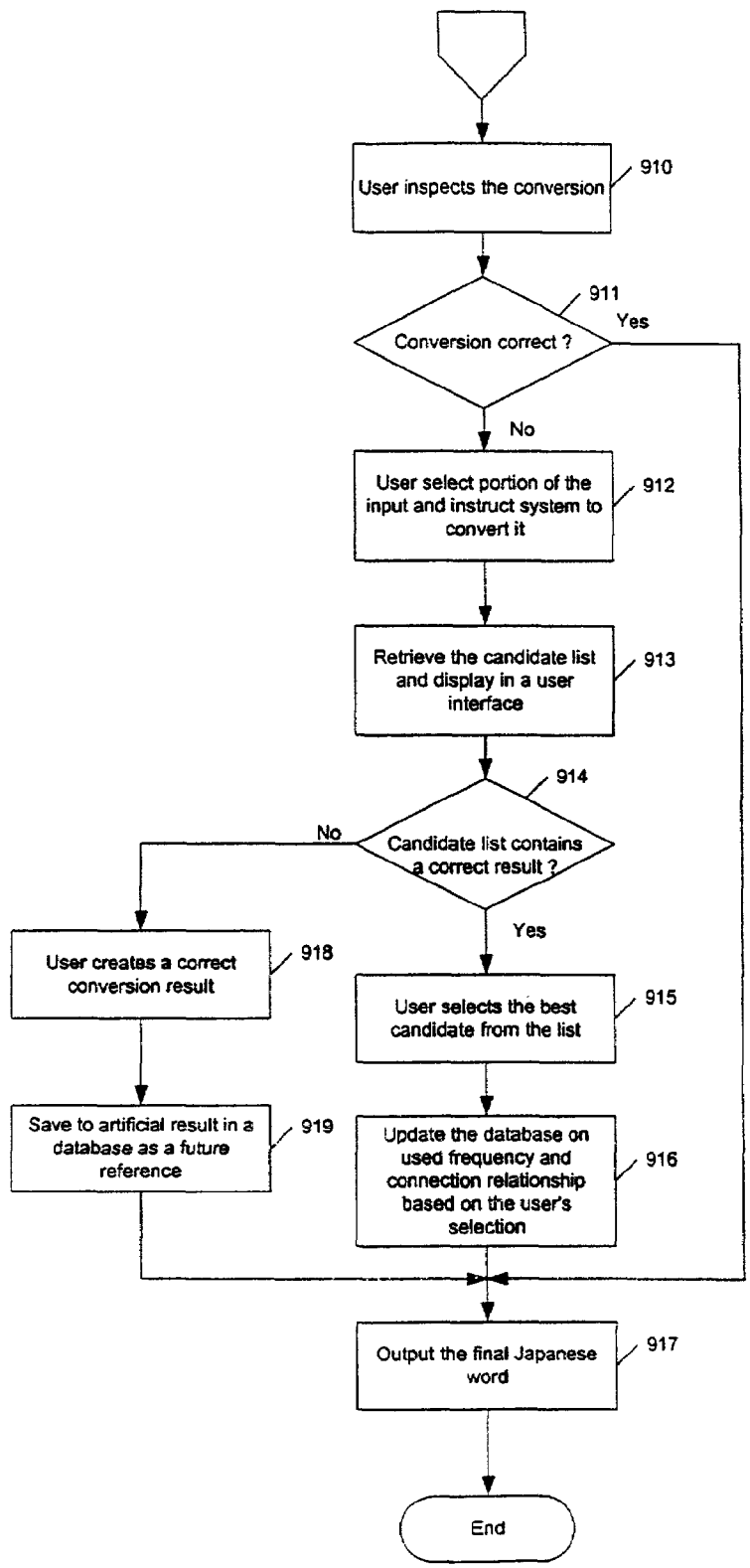

FIG. 9 shows a method of another embodiment of the invention, converting a source character string to a target character string. The method receives a first character string having the source character string from a user interface. It divides the first character string into multiple sub-strings. It then converts the sub-strings to second character strings through a dictionary. At the same time, the method creates third character strings corresponding to the sub-strings through a virtual dictionary. It then analyzes the second and third character strings and constructs fourth character strings based on the analysis. Next it creates a candidate list based on the priority information and selects the final candidate with the highest priority from the candidate list.

Referring to FIG. 9, Japanese hiragana character string is received 901 through a user interface, such as keyboard. In one embodiment, the user interface may include a touch pad from a palm pilot, or other inputting devices. In a further embodiment, the Japanese hiragana character string may be received from an application software through an application programming interface (API). The hiragana character string is divided 902 into multiple sub-strings. The morphological analysis engine (MAE) then communicates with the dictionary management module (DMM) to convert 903 each of the sub-strings into corresponding Japanese words through regular dictionaries. At the same time, the MAE also instructs DMM to create 904 all possible katakana words corresponding to the sub-strings through the virtual dictionary. Next the system constructs 905 possible candidates from the all possible words including Japanese words from the regular dictionaries and artificial katakana words generated from the virtual dictionary, and forms a candidate list. The possible choices of the katakana words from the virtual dictionary may include part speech information. The system may use a set of rules to construct the candidates. In one embodiment, the set if rules may include usage frequency of each katakana character set and connection relationship between each choice. In another embodiment, the set of rules may include word's semantic or grammar rules. This information may be stored in the database where the all possible katakana character sets are stored. In another embodiment, these rules may be stored in a separate database. The system next retrieves 906 the usage frequency and connection relationships from the database, and applies 907 the semantic and grammar rules to the analysis. Based on this information, the system calculates 908 cost values for all candidates. The candidate with least cost value is then selected 909 as final target character set. The final target character set may be displayed to a user interface in a display device.

In a yet another aspect of the invention, a user may inspect 910 the result provided by the kana-kanji conversion engine to check 911 whether the conversion is correct. If the user is satisfied with the result, the conversion is done. However, if the conversion is incorrect, the user selects 912 the portion of the input (e.g., original hiragana input) and instruct the system to explicitly convert it. The system in turn provides all possible combination of Japanese words including the artificial katakana words, in a form of candidate list. The user then retrieves 913 such candidate list and display in a user interface. In one embodiment, the user interface is in a form of pop-up window. Next, the user may check 914 whether the candidate list contain the correct conversion. If the candidate list contains the correct conversion, the user selects 915 the best candidate from the candidate list. The system then updates 916 its database (e.g., knowledge bases) of the parameters (e.g., usage frequency, connection relationship, etc.) regarding to the user selection. The final selection is then outputted 917 to the application. In one embodiment, if the candidate list does not contain the correct result, the user may construct 918 and create the correct result manually through a user interface. Once the artificial conversion is created by the user, the system saves 919 such results in its database as a future reference.

In the foregoing specification, the invention has been described with reference to specific exemplary embodiments thereof. It will be evident that various modifications may be made thereto without departing from the broader spirit and scope of the invention as set fourth in the following claims. The specification and drawings are, accordingly, to be regarded in an illustrative sense rather than a restrictive sense.

What is claimed is:

1. A machine implemented method of converting a source character string to a target character string, comprising:
   dividing a first character string into a plurality of sub-strings, the first character string having the source character string;
   converting the plurality of sub-strings to second character strings, through a dictionary;
   creating artificially created words as third character strings corresponding to the plurality of sub-strings;
   analyzing the second character strings and the third character strings;
   constructing fourth character strings from the second and third character strings based on the analysis;
   creating a candidate list based on the fourth character strings;
   selecting the target character string from the candidate list; and
   outputting the target character string.

2. The method of claim 1, wherein the first character string comprises Japanese hiragana characters and wherein the dictionary is stored in a machine readable form prior to the receiving.

3. The method of claim 1, wherein the second character strings comprise Japanese words.

4. The method of claim 1, wherein the third character strings comprise katakana characters.

5. The method of claim 1, further comprising:
   constructing the fourth character strings from the second character strings, if the second character strings contain a character string corresponding to the first character string; and
   constructing the fourth character strings from the third character strings if the second character strings do not contain the character string corresponding to the first character sting.

6. The method of claim 1, further comprising prioritizing the second character strings and the third character strings, based on priority information associated with the second character strings and the third character strings.

7. The method of claim 6, the priority information comprises:
   usage frequency of each of the second character strings;
   character segment length; and
   connection relationship information between the second character strings.

8. The method of claim 6, further comprising calculating a priority value for each of the second and third character strings based on the priority information.

9. The method of claim 8, further comprising assigning a priority value to each of the third character strings.

10. The method of claim 9, wherein the priorities of the third character strings are lower than the priorities of the second character strings.

11. The method of claim 1, further comprising retrieving priority information of the second character strings from the dictionary.

12. The method of claim 1, wherein the dictionary comprises multiple dictionaries.

13. The method of claim 1, wherein the analysis of the second and third character strings is performed based on a set of rules.

14. The method of claim 13, wherein the set of rules comprises information of usage frequency of the character strings and connection relationship between the character strings.

15. The method of claim 14, wherein the set of rules further comprises information of character segment length and semantic/grammar rules.

16. The method of claim 13, wherein the construction of the fourth character strings from the second and third character strings is based on the set of rules.

17. The method of claim 13, wherein the set of rules is defined by a user through a user interface.

18. The method of claim 1, further comprising calculating priority value of each of the fourth character strings.

19. The method of claim 18, wherein the candidate list is created based on the priority values of the fourth character strings.

20. The method of claim 19, wherein the candidate with the highest priority value is selected as the target character string from the candidate list.

21. The method of claim 1, further comprising:
   examining the output of the target character string to determine if the target character string is correct;
   retrieving the candidate list of alternative character strings, if the output is incorrect; and
   selecting a character string as final output from the candidate list.

22. The method of claim 21, wherein a user examines the output of the target character string.

23. The method of claim 21, further comprising displaying the candidate list to a user interface.

24. The method of claim 23, wherein the user interface comprises a pop-up window.

25. The method of claim 21, wherein a user selects a character string as final output from the candidate list.

26. The method of claim 21, further comprising updating a database regarding to the priority information of the final output character string, based on the selection of the final output from the candidate list.

27. The method of claim 21, wherein if the candidate list does not contain the correct target character string, the method further comprises:
 providing the target character string by a user;
 converting the first character string to the target character string manually; and
 storing the target character string provided by the user, to a database.

28. The method of claim 27, wherein the target character string is entered by the user through a user interface.

29. The method of claim 1, wherein the creation of the third character strings is performed through a look-up table.

30. The method of claim 1, wherein the creation of the third character strings is performed through an algorithm.

31. A data processing system implemented method for converting a first Japanese character input string to a second Japanese character string, the method comprising:
 in response to a hiragana input, automatically determining a plurality of possible katakana candidates for each sub-string of the hiragana input;
 analyzing the plurality of possible katakana candidates to convert the hiragana input to katakana characters, each of the possible katakana candidates being associated with a score representing a relevancy between the sub-string of the hiragana input and a possible katakana candidate;
 selecting one of the katakana candidates having the highest score in response to the analyzing if a regular Japanese dictionary does not contain one or more well-known Japanese words corresponding to the sub-string of the hiragana input; and
 outputting converted text comprising the one of the katakana candidates to represent the hiragana input.

32. The method of claim 31, wherein the converted text further comprises kanji characters.

33. An apparatus of converting a source character string to a target character string, comprising:
 means for receiving a first character string having the source character string;
 means for dividing the first character string into a plurality of sub-strings;
 means for converting the plurality of sub-strings to second character strings, through a dictionary;
 means for creating artificially created words as third character strings corresponding to the plurality of sub-strings;
 means for analyzing the second character strings and the third character strings;
 means for constructing fourth character strings from the second and third character strings based on the analysis;
 means for creating a candidate list based on the fourth character strings;
 means for selecting the target character string from the candidate list; and
 means for outputting the target character strings.

34. The apparatus of claim 33, wherein the first character string comprises Japanese hiragana characters and wherein the dictionary is stored in a machine readable form prior to the receiving.

35. The apparatus of claim 33, wherein the second character strings comprise Japanese words.

36. The apparatus of claim 33, wherein the third character strings comprise katakana characters.

37. The apparatus of claim 33, further comprising:
 means for constructing the fourth character strings from the second character strings, if the second character strings contain a character string corresponding to the first character string; and
 means for constructing the fourth character strings from the third character strings if the second character strings do not contain the character string corresponding to the first character sting.

38. The apparatus of claim 33, further comprising means for prioritizing the second character strings and the third character strings, based on priority information associated with the second character strings and the third character strings.

39. The apparatus of claim 38, the priority information comprises:
 usage frequency of each of the second character strings;
 character segment length; and
 connection relationship information between the second character strings.

40. The apparatus of claim 39, further comprising means for calculating a priority value for each of the second and third character strings based on the priority information.

41. The apparatus of claim 40, further comprising means for assigning a priority value to each of the third character strings.

42. The apparatus of claim 41, wherein the priorities of the third character strings are lower than the priorities of the second character strings.

43. The apparatus of claim 33, further comprising means for retrieving priority information of the second character strings from the dictionary.

44. The apparatus of claim 33, wherein the dictionary comprises multiple dictionaries.

45. The apparatus of claim 33, wherein the analysis of the second and third character strings is performed based on a set of rules.

46. The apparatus of claim 45, wherein the set of rules comprises information of usage frequency of the character strings and connection relationship between the character strings.

47. The apparatus of claim 46, wherein the set of rules further comprises information of character segment length and semantic/grammar rules.

48. The apparatus of claim 45, wherein the construction of the fourth character strings from the second and third character strings is based on the set of rules.

49. The apparatus of claim 45, wherein the set of rules is defined by a user through a user interface.

50. The apparatus of claim 33, further comprising means for calculating priority value of each of the fourth character strings.

51. The apparatus of claim 50, wherein the candidate list is created based on the priority values of the fourth character strings.

52. The apparatus of claim 51, wherein the candidate with the highest priority value is selected as the target character string from the candidate list.

53. The apparatus of claim 33, further comprising:
means for examining the output of the target character string to determine if the target character string is correct;
means for retrieving the candidate list of alternative character strings, if the output is incorrect; and
means for selecting a character string as final output from the candidate list.

54. The apparatus of claim 53, wherein a user examines the output of the target character string.

55. The apparatus of claim 53, further comprising means for displaying the candidate list to a user interface.

56. The apparatus of claim 55, wherein the user interface comprises a pop-up window.

57. The apparatus of claim 53, wherein a user selects a character string as final output from the candidate list.

58. The apparatus of claim 53, further comprising means for updating a database regarding to the priority information of the final output character string, based on the selection of the final output from the candidate list.

59. The apparatus of claim 53, wherein if the candidate list does not contain the correct target character string, the apparatus further comprises:
means for providing the target character string by a user;
means for converting the first character string to the target character string manually; and
means for storing the target character string provided by the user, to a database.

60. The apparatus of claim 59, wherein the target character string is entered by the user through a user interface.

61. The apparatus of claim 33, wherein the creation of the third character strings is performed through a look-up table.

62. The apparatus of claim 33, wherein the creation of the third character strings is performed through an algorithm.

63. A apparatus for converting a first Japanese character input string to a second Japanese character string, the apparatus comprising:
in response to a hiragana input, means for automatically determining a plurality of possible katakana candidates for each sub-string of the hiragana input;
means for analyzing the plurality of possible katakana candidates to convert the hiragana input to katakana characters, each of the possible katakana candidates being associated with a score representing a relevancy between the sub-string of the hiragana input and a possible katakana candidate;
means for selecting one of the katakana candidates having the highest score in response to the analyzing if a regular Japanese dictionary does not contain one or more well-known Japanese words corresponding to the sub-string of the hiragana input; and
means for outputting converted text comprising the one of the katakana candidates to represent the hiragana input.

64. The apparatus of claim 63, wherein the converted text further comprises kanji characters.

65. A machine readable medium having stored thereon executable code which causes a machine to perform a method of converting a source character string to a target character string, the method comprising:
receiving a first character string having the source character string;
dividing the first character string into a plurality of sub-strings;
converting the plurality of sub-strings to second character strings, through a dictionary;
creating artificially created words as third character strings corresponding to the plurality of sub-strings;
analyzing the second character strings and the third character strings;
constructing fourth character strings from the second and third character strings based on the analysis;
creating a candidate list based on the fourth character strings;
selecting the target character string from the candidate list; and outputting the target character strings.

66. The machine readable medium of claim 65, wherein the first character string comprises Japanese hiragana characters and wherein the dictionary is stored in a machine readable form prior to the receiving.

67. The machine readable medium of claim 65, wherein the second character strings comprise Japanese words.

68. The machine readable medium of claim 65, wherein the third character strings comprise katakana characters.

69. The machine readable medium of claim 65, wherein the method further comprises:
constructing the fourth character strings from the second character strings, if the second character strings contain a character string corresponding to the first character string; and
constructing the fourth character strings from the third character strings if the second character strings do not contain the character string corresponding to the first character sting.

70. The machine readable medium of claim 65, wherein the method further comprises prioritizing the second character strings and the third character strings, based on priority information associated with the second character strings and the third character strings.

71. The machine readable medium of claim 70, the priority information comprises:
usage frequency of each of the second character strings;
character segment length; and
connection relationship information between the second character strings.

72. The machine readable medium of claim 70, wherein the method further comprises calculating a priority value for each of the second and third character strings based on the priority information.

73. The machine readable medium of claim 72, wherein the method further comprises assigning a priority value to each of the third character strings.

74. The machine readable medium of claim 73, wherein the priorities of the third character strings are lower than the priorities of the second character strings.

75. The machine readable medium of claim 65, wherein the method further comprises retrieving priority information of the second character strings from the dictionary.

76. The machine readable medium of claim 65, wherein the dictionary comprises multiple dictionaries.

77. The machine readable medium of claim 65, wherein the analysis of the second and third character strings is performed based on a set of rules.

78. The machine readable medium of claim 77, wherein the set of rules comprises information of usage frequency of the character strings and connection relationship between the character strings.

79. The machine readable medium of claim 78, wherein the set of rules further comprises information of character segment length and semantic/grammar rules.

80. The machine readable medium of claim 77, wherein the construction of the fourth character strings from the second and third character strings is based on the set of rules.

81. The machine readable medium of claim 77, wherein the set of rules is defined by a user through a user interface.

82. The machine readable medium of claim 65, wherein the method further comprises calculating priority value of each of the fourth character strings.

83. The machine readable medium of claim 82, wherein the candidate list is created based on the priority values of the fourth character strings.

84. The machine readable medium of claim 83, wherein the candidate with the highest priority value is selected as the target character string from the candidate list.

85. The machine readable medium of claim 65, wherein the method further comprises:
examining the output of the target character string to determine if the target character string is correct;
retrieving the candidate list of alternative character strings, if the output is incorrect; and
selecting a character string as final output from the candidate list.

86. The machine readable medium of claim 85, wherein a user examines the output of the target character string.

87. The machine readable medium of claim 85, wherein the method further comprises displaying the candidate list to a user interface.

88. The machine readable medium of claim 87, wherein the user interface comprises a pop-up window.

89. The machine readable medium of claim 85, wherein a user selects a character string as final output from the candidate list.

90. The machine readable medium of claim 85, wherein the method further comprises updating a database regarding to the priority information of the final output character string, based on the selection of the final output from the candidate list.

91. The machine readable medium of claim 85, wherein if the candidate list does not contain the correct target character string, the method further comprises:
providing the target character string by a user;
converting the first character string to the target character string manually; and
storing the target character string provided by the user, to a database.

92. The machine readable medium of claim 91, wherein the target character string is entered by the user through a user interface.

93. The machine readable medium of claim 65, wherein the creation of the third character strings is performed through a look-up table.

94. The machine readable medium of claim 65, wherein the creation of the third character strings is performed through an algorithm.

95. A machine readable medium for converting a first Japanese character input string to a second Japanese character string, the method comprising:
in response to a hiragana in put, automatically determining a plurality of possible katakana candidates for each sub-string of the hiragana input;
analyzing the plurality of possible katakana candidates to convert the hiragana input to katakana characters, each of the possible katakana candidates being associated with a score representing a relevancy between the sub-string of the hiragana input and a possible katakana candidate;
selecting one of the katakana candidates having the highest score in response to the analyzing if a regular Japanese dictionary does not contain one or more well-known Japanese words corresponding to the sub-string of the hiragana input; and
outputting converted text comprising the one of the katakana candidates to represent the hiragana input.

96. The machine readable medium of claim 95, wherein the converted text further comprises kanji characters.

97. An apparatus for converting a source character string to a target character string, comprising:
an input method for receiving the first character string having the source character string;
a regular dictionary coupled to convert the first character string to second character strings;
a virtual dictionary coupled to generate artificially created words as third character strings based on the first character string;
a morphological analysis engine (MAE) coupled to the input method, the MAE performing morphological analysis on the first character string and converting the first character string to the target character string based on the second and third character strings;
an output unit coupled to the MAE.

98. The apparatus of claim 97, wherein the input method comprises an application programming interface (API) for receiving the first character string.

99. The apparatus of claim 97, wherein the input method receives the first character string from a keyboard.

100. The apparatus of claim 97, wherein the input method receives the first character string from a personal digital assistant (PDA).

101. The apparatus of claim 97, wherein the first character string comprises Japanese hiragana characters.

102. The apparatus of claim 97, wherein the target character string comprises Japanese characters, wherein the Japanese characters comprise:
hiragana characters;
katakana characters; and
kanji characters.

103. The apparatus of claim 97, wherein the MAE divides the first character string into a plurality of sub-strings and converts the plurality of sub-strings to the second character strings through the regular dictionary.

104. The apparatus of claim 97, wherein the MAE divides the first character string into a plurality of sub-strings and generates the third character strings corresponding to the plurality of sub-strings through the virtual dictionary.

105. The apparatus of claim 104, wherein the virtual dictionary provides part-of-speech information for each of the third character strings.

106. The apparatus of claim 104, wherein the virtual dictionary assigns a priority value to each of the third character strings.

107. The apparatus of claim 106, wherein the priorities of the third character strings are lower than the priorities of the character strings from the regular dictionary.

108. The apparatus of claim 104, wherein the MAE selects candidates from the output of the regular dictionary, and the MAE selects the candidates from the output of the virtual dictionary if the regular dictionary does not contain the correct conversion.

109. The apparatus of claim 97, wherein the regular dictionary comprises multiple dictionaries.

110. The apparatus of claim 97, further comprising a dictionary management module (DMM) coupled to the MAE, the dictionary management managing the regular dictionary and the virtual dictionary.

111. The apparatus of claim 110, wherein the MAE accesses the regular dictionary and virtual dictionary through the DMM.

112. The apparatus of claim 97, further comprising a user interface coupled to provide user interaction to the conversion generated from the MAE.

113. The apparatus of claim 112, wherein if the conversion generated from the MAE is incorrect, a user selects a final output through the user interface, from a candidate list generated by the MAE.

114. The apparatus of claim 97, wherein the output unit transmits the conversion to a display device.

115. The apparatus of claim 97, wherein the output unit transmits the conversion to an application through an API.

116. The apparatus of claim 97, wherein the regular dictionary is stored in a network storage location.

* * * * *